(12) United States Patent
Middleton et al.

(10) Patent No.: US 9,967,031 B1
(45) Date of Patent: May 8, 2018

(54) ELECTRO-OPTIC COMMUNICATIONS SYSTEM WITH STIMULATED BRILLOUIN SCATTERING (SBS) BANDPASS FILTER

(71) Applicant: Harris Corporation, Melbourne, FL (US)

(72) Inventors: Charles F. Middleton, Rockledge, FL (US); John R. Desalvo, Satellite Beach, FL (US); Anthony C. Klee, Orlando, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days. days.

(21) Appl. No.: 15/479,608

(22) Filed: Apr. 5, 2017

(51) Int. Cl.
  *H04B 10/2537* (2013.01)
  *H04B 10/2575* (2013.01)
  *H04B 10/564* (2013.01)

(52) U.S. Cl.
  CPC ..... *H04B 10/2537* (2013.01); *H04B 10/2575* (2013.01); *H04B 10/564* (2013.01)

(58) Field of Classification Search
  CPC .............. H04B 10/2537; H04B 10/564; H04B 10/2575
  See application file for complete search history.

(56) References Cited

U.S. PATENT DOCUMENTS

| | | | |
|---|---|---|---|
| H1791 H * | 3/1999 | Williams | ........................ 359/327 |
| 6,535,328 B2 * | 3/2003 | Yao | .................... H04B 10/2916 |
| | | | 250/227.11 |
| 7,650,080 B2 * | 1/2010 | Yap | ............................ G02F 2/02 |
| | | | 398/161 |
| 8,842,992 B2 * | 9/2014 | Middleton | ............. H04B 10/00 |
| | | | 398/115 |
| 2004/0136649 A1 | 7/2004 | Mangir et al. | |
| 2004/0136849 A1 * | 7/2004 | Du | ........................ E21B 43/128 |
| | | | 417/423.11 |
| 2009/0008536 A1 * | 1/2009 | Hartog | .................. G01J 3/4412 |
| | | | 250/227.14 |

(Continued)

OTHER PUBLICATIONS

Marpaung et al. "Low-power, chip-based stimulated Brillouin scattering microwave photonic filter with ultrahigh selectivity" Optica: vol. 2, No. 2, Feb. 2015; pp. 76-83.

(Continued)

*Primary Examiner* — Danny Leung
(74) *Attorney, Agent, or Firm* — Allen, Dyer, Doppelt + Gilchrist, P.A.

(57) ABSTRACT

A communications system may include an optical source to generate an optical carrier signal, and an RF signal path including a first electro-optic (EO) modulator to modulate the optical carrier signal based upon an RF signal, a stimulated Brillouin scattering (SBS) device coupled to the first EO modulator, and an optical circulator downstream from the SBS device. A local oscillator (LO) path may include a second EO modulator coupled to the optical source to modulate the optical carrier signal based upon an LO signal, and an optical bandpass filter(s) coupled to the second EO modulator. A filter function path may be coupled to the optical circulator and include a third EO modulator to perform optical modulation based upon a filter function signal. A detector may be coupled to the RF signal path and the LO path to generate an intermediate frequency (IF) signal.

20 Claims, 3 Drawing Sheets

(56) References Cited

U.S. PATENT DOCUMENTS

2014/0218717 A1* 8/2014 Zhang .................. G01K 11/32
356/32

OTHER PUBLICATIONS

Stern et al. "Tunable sharp and highly selective microwave-photonic band-pass filters based on stimulated Brillouin scattering," Photon. Res: vol. 2 No. 4. Aug. 2014; pp. B18-B25.

Ge et al "Passband switchable microwave photonic multiband filter" Sci. Rep: Nov. 2, 2015;5; Abstract Only.

Zhang et al. "Tunable and reconfigurable bandpass microwave photonic filters utilizing integrated optical processor on silicon-on-insulator substrate." IEEE Photonics Technology Letters: vol. 24 No. 17; 2012: Abstract Only.

Song et al. "Reconfigurable and tunable flat-top microwave photonic filters utilizing optical frequency combs." IEEE Photonics Technology Letters: vol. 23 No. 21, Nov. 1, 2011; 1618-1620.

Zhang et al. "Microwave photonic filter with reconfigurable and tunable bandpass response using integrated optical signal processor based on microring resonator" Optical Engineering: 52.12, Dec. 16, 2013; Abstract Only.

Yi et al. "Polarization-Independent Rectangular Microwave Photonic Filter Based on Stimulated Brillouin Scattering" Journal of Lightwave Technology, vol. 34, No. 2, Jan. 15, 2016; pp. 669-675.

* cited by examiner

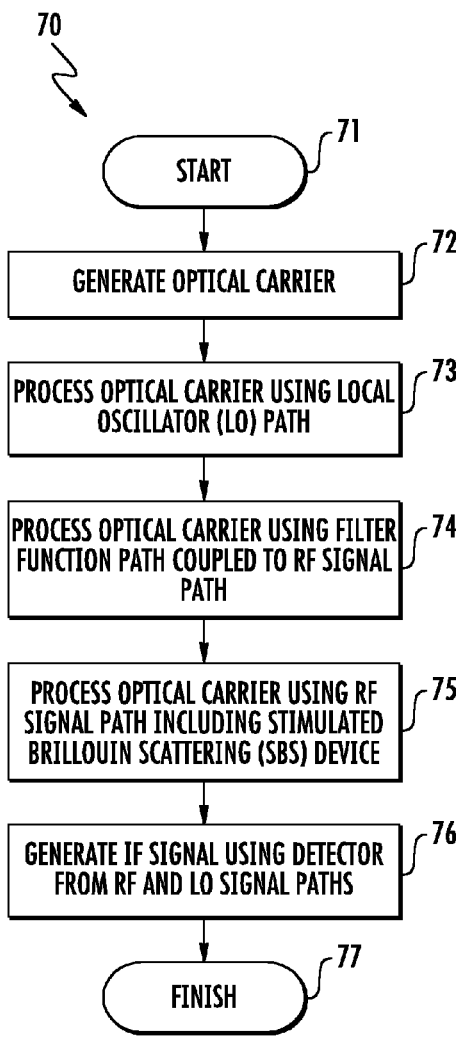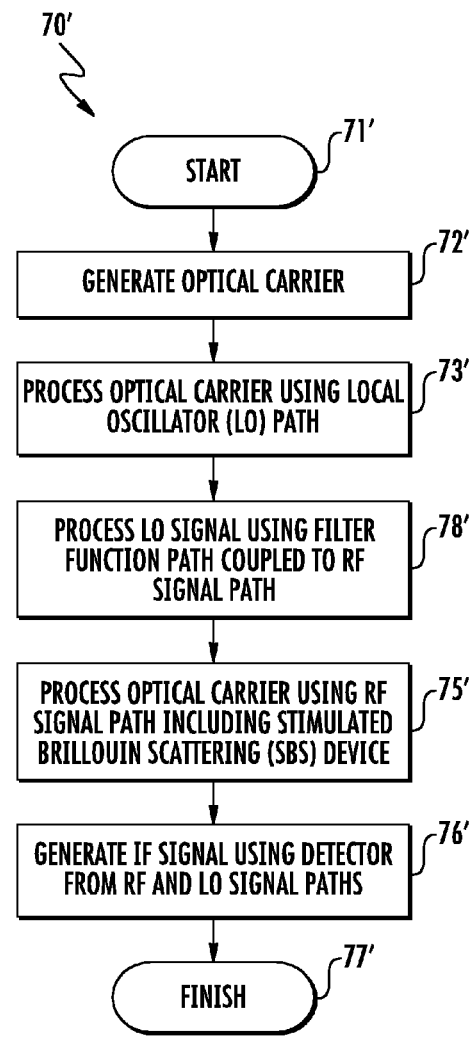
FIG. 3
FIG. 4

ELECTRO-OPTIC COMMUNICATIONS SYSTEM WITH STIMULATED BRILLOUIN SCATTERING (SBS) BANDPASS FILTER

TECHNICAL FIELD

The present invention relates to the field of communications, and more particularly, to radio frequency (RF) communications and related methods.

BACKGROUND

A typical wireless communication system includes a plurality of wireless communications devices exchanging data with each other. In some wireless communication systems, for example, infrastructure networks, the system may further include a wireless base station for managing communications between the wireless communications devices. In other words, each intra-system communication would be exchanged via the wireless base station. In other wireless communication systems, for example, mesh networks and ad hoc wireless networks, the wireless base station may be omitted, i.e. the wireless communications devices may communicate directly with each other.

A typical Extremely High Frequency (EHF), i.e. 30 to 300 GHz, communication system operating at this band may have some drawbacks. For example, transmission of the signals over coaxial cable may incur large attenuation effects. Moreover, in applications where RF devices are used, the size, weight, and power (SWaP) of the components may increase to undesirable levels. Furthermore, downstream receiver processing, such as downconverting, and signal addressing may be difficult.

One approach to addressing these drawbacks in EHF communication systems may include the use of optical signal processing components. An advantage of such systems is the ability to transmit EHF signals from a remote location without the degradation of the signal incumbent in RF applications.

One particularly advantageous approach is set forth in U.S. Pat. No. 8,842,992 to Middleton et al., which is assigned to the present Assignee and hereby incorporated herein in its entirety by reference. Middleton et al. is directed to a communications device which includes a transmitter device having an optical source configured to generate an optical carrier signal, a first E/O modulator coupled to the optical source and configured to modulate the optical carrier signal with an input signal having a first frequency, and a second E/O modulator coupled to the optical source and configured to modulate the optical carrier signal with a reference signal. The communications device includes an optical waveguide coupled to the transmitter device, and a receiver device coupled to the optical waveguide and including an O/E converter coupled to the optical waveguide and configured to generate an output signal comprising a replica of the input signal at a second frequency based upon the reference signal.

Despite the advantages of such approaches, further functionality may be required to meet the increasing challenges associated with operation in spectrally congested environments, for example.

SUMMARY

A communications system may include an optical source configured to generate an optical carrier signal, and a radio frequency (RF) signal path including a first electro-optic (EO) modulator coupled to the optical source and configured to modulate the optical carrier signal based upon an RF signal, a stimulated Brillouin scattering (SBS) device coupled to the first EO modulator, and an optical circulator coupled to the SBS device. The communications device may further include a local oscillator (LO) path comprising a second EO modulator coupled to the optical source and configured to modulate the optical carrier signal based upon an LO signal, and at least one optical bandpass filter coupled to the second EO modulator. The communications device may also include a filter function path including a third EO modulator to perform optical modulation based upon a filter function signal and having an output coupled to the optical circulator, and a detector coupled to an output of the RF signal path and an output of the LO path and configured to generate an intermediate frequency (IF) signal based thereon.

More particularly, the RF signal path may further include an optical isolator coupled between the first EO modulator and the SBS device. The filter function path may further include a filter function signal generator coupled to the third EO modulator. By way of example, one or more of the first, second, and third EO modulators may comprise Mach-Zehnder modulators. In one example implementation, the filter function path may be downstream from the LO path.

In accordance with another example, the at least one optical bandpass filter may comprise a pair of optical bandpass filters, and the LO path further may include an optical signal amplifier coupled between the pair of first optical bandpass filters. Furthermore, a first power divider may be coupled between the optical source and the RF signal path, and between the optical source and the LO path. Moreover, a second power divider may further be coupled between the first power divider and the LO signal path, and between the first power divider and the filter function signal path.

A related communications method may include generating an optical carrier signal using an optical source, and processing the optical carrier signal using a radio frequency (RF) signal path comprising a first electro-optic (EO) modulator coupled to the optical source and configured to modulate the optical carrier signal based upon an RF signal, a stimulated Brillouin scattering (SBS) device coupled to the first EO modulator, and an optical circulator downstream from the SBS device. The method may further include processing the optical carrier signal using a local oscillator (LO) path comprising a second EO modulator coupled to the optical source and configured to modulate the optical carrier signal based upon an LO signal, and at least one optical bandpass filter downstream from the second EO modulator. The method may also include processing the optical carrier signal using a filter function path comprising a third EO modulator configured to modulate the optical carrier signal based upon a filter function signal and having an output coupled to the optical circulator, and generating an intermediate frequency (IF) signal using a detector coupled to an output of the RF signal path and an output of the LO path.

BRIEF DESCRIPTION OF THE DRAWINGS

FIGS. 3 and 4 are flow diagrams illustrating method aspects associated with the system of FIGS. 1 and 2, respectively.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

As discussed above, it is becoming increasingly more challenging to operate RF communications systems (e.g., microwave systems) in spectrally congested environments, because doing so requires bandpass filters with high selectivity that may be dynamically reconfigured. Such filters may require rapid configuration, tunability over a wide frequency range, and adjustability in both center frequency and bandwidth. However, typical microwave bandpass filters may be limited in frequency and bandwidth, and are generally not widely tunable. Moreover, photonics-based microwave filters may either be too wide, not reconfigurable, tune too slowly, or have poor selectivity for many applications.

Figure 1:
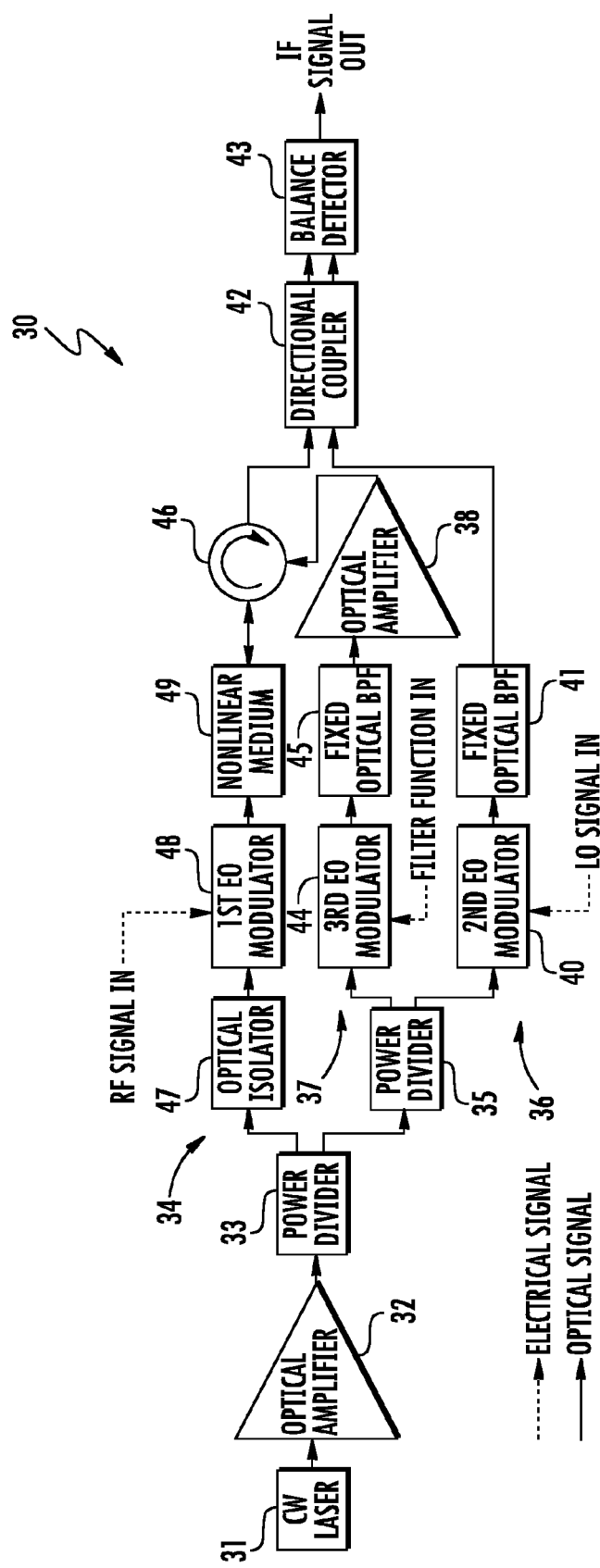
FIG. 1 is a schematic block diagram of a communications system including a photonic frequency converter providing signal filtering based upon stimulated Brillouin scattering (SBS) in accordance with an example embodiment.

Referring initially to FIG. 1, a communications system 30 is first described which incorporates an RF (e.g., microwave) photonic frequency converter which advantageously applies a photonic filtering technique based on stimulated Brillouin scattering (SBS), a nonlinear optical effect that occurs above certain optical power levels in various media and provides frequency-specific gain or loss bands based on the optical frequency of an input pump signal. More particularly, the system 30 illustratively includes an optical source, here a continuous-wave (CW) laser 31, which generates an optical carrier signal that is amplified by an optical amplifier 32. By way of example, the CW laser 31 may have a wavelength of 1550 nm, although other wavelengths may be used in different embodiments. Furthermore, the optical amplifier 32 may be an erbium-doped fiber amplifier (EDFA), for example.

In the illustrated example, the light is divided along two paths by a first power divider 33. The first path is an RF signal path 34, while the second path is further divided into two additional paths by a second power divider 35, namely a local oscillator (LO) path 36 and a filter function path 37. The first power divider 33 may use a 50/50 split ratio, although other ratios may be used in different embodiments (e.g. a 90/10 split ratio, in which 90% of the optical power goes to the signal path and 10% goes to the LO and filter function paths 36, 37). Similarly, the second power divider 35 may use a 50/50 split ratio or some other ratio, although because the filter function path 37 includes an optical amplifier 38, more of the initial optical power may be kept on the LO path 36 in some implementations, if desired.

After the second power divider 35, light on the LO path 36 is modulated by an LO input signal from a signal generator or synthesizer using a second electro-optic (EO) modulator 40. A fixed optical bandpass filter (BPF) 41, such as a fiber Bragg grating, selects either the upper or lower sideband of the modulated LO signal from the second EO modulator 40, and suppresses the alternate sideband and optical carrier signal. The filtered LO sideband is then brought to an optical directional coupler 42, where it is combined with the filtered RF signal sideband from the RF signal path 34 and provided to a balanced detector 43 to generate an IF output signal.

On the filter function path 37, the light from the second power divider 35 is modulated by a third EO modulator 44 based upon a filter function input signal. The filter function input signal may be provided from an arbitrary waveform generator (AWG), for example. More particularly, the filter function may be formed by combining multiple signals at different frequencies to use as pump signals in the SBS filter. Each pump signal will provide a Brillouin-shifted gain bandwidth whose width is dependent on a nonlinear optical medium 49, or other SBS device, in the RF signal path 34, e.g., on the order of 30 MHz. By assembling multiple pump signals, the filter passband width, center frequency, and shape may accordingly be set by the AWG. Further details regarding SBS microwave photonic filtering may be found in D. Marpaung et al., "Low-power, chip-based stimulated Brillouin scattering microwave photonic filter with ultrahigh selectivity," Optica 2, 76-83 (2015), and Y. Stern et al., "Tunable sharp and highly selective microwave-photonic band-pass filters based on stimulated Brillouin scattering," Photon. Res. 2, B18-B25 (2014), which are hereby incorporated herein in their entireties by reference.

A fixed optical bandpass filter 45, such as a fiber Bragg grating, follows the third EO modulator 44 to select either the upper or lower sideband of the modulated filter function. In accordance with one example embodiment, the fixed optical bandpass filters 41, 45 may be single-sideband suppressed-carrier signal filters. The optical amplifier 38 boosts the pump signals above an SBS threshold so that they create the desired SBS filter, as will be appreciated by those skilled in the art. The optically modulated and amplified filter function signal is introduced to the RF signal path 34 using an optical circulator 46, so that it propagates along the same path as the RF signal, but in the opposite direction.

On the RF signal path 34, light passes through an optical isolator 47 to reduce the counter-propagating pump from the filter function path. The RF signal (e.g., microwave) is modulated onto the light using a first BO modulator 48, creating copies of the RF input spectrum as optical sidebands on either side of the laser signal. It should be noted that in some embodiments the optical isolator 47 may be positioned downstream from the first BO modulator 48, if desired.

When the modulated signal interacts with the counter-propagating filter function pump in the nonlinear optical medium 49, the portion of the RF spectrum that corresponds to the Brillouin-shifted filter function will be selectively amplified passing through the medium, while any light outside the filter pass band will be unaffected. The filtered signal then passes through the optical circulator 46 and directional coupler 42, where it is combined with the LO sideband. Balanced detection removes common-mode noise and increases the signal power of the IF output signal.

By way of example, one or more of the first, second, and third EO modulators 40, 44, and 48 may be Mach-Zehnder modulators. However, other types of EO modulators may be used in different embodiments.

Figure 2:
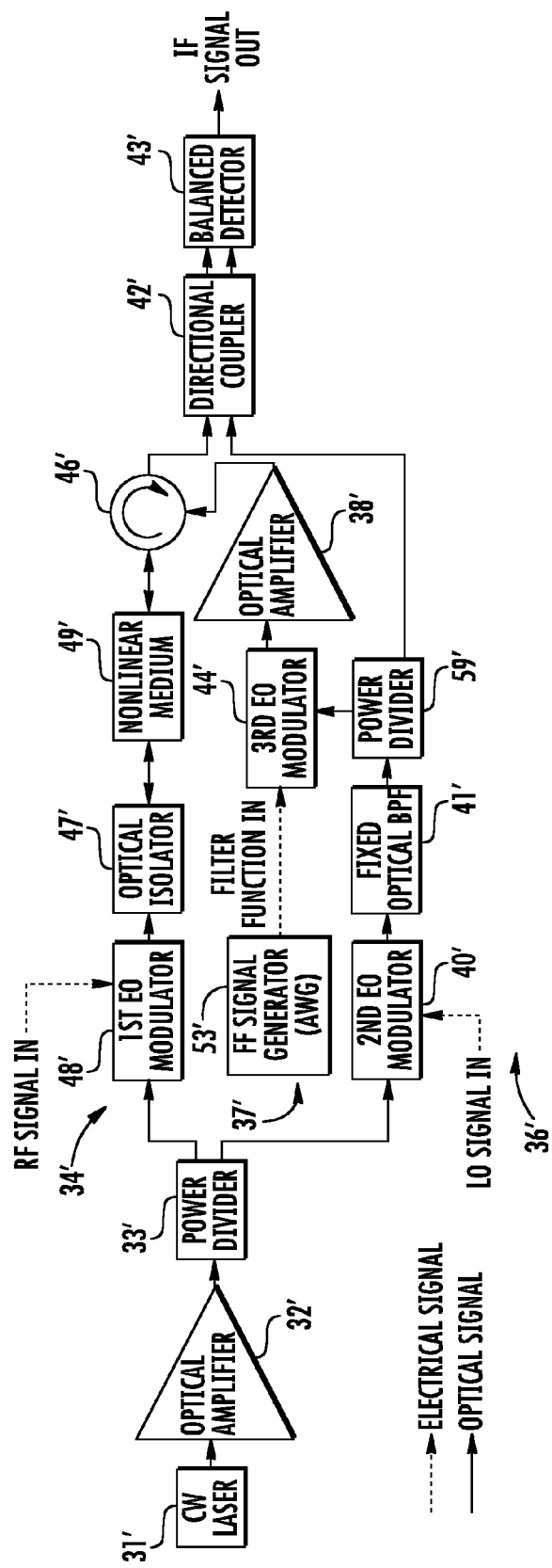
FIG. 2 is a schematic block diagram of a communications system including a photonic frequency converter providing signal filtering based upon SBS in accordance with another example embodiment.

Turning to FIG. 2, another example system 30' which may advantageously apply a microwave photonic filtering technique to a microwave photonic frequency converter based upon SBS is now described. A CW laser 31' outputs an optical carrier signal, which is amplified by an optical amplifier 32' (e.g., an EDFA amplifier), and the light is divided along two paths by a power divider 33': the signal path 34' and the LO path 36'.

Light on the LO path 36' is modulated by an LO input signal from a signal generator or synthesizer using a second EO modulator 40' (e.g., a Mach-Zehnder modulator or MZM, although other types of EO modulators may also be used be used). A fixed optical bandpass filter 41', such as a fiber Bragg grating, selects either the upper or lower sideband of the modulated LO signal, and suppresses the alternate sideband and optical carrier signal. The filtered LO sideband signal is then divided by a power divider 59', the outputs of which are provided to a third EO modulator 44' (e.g., an MZM) and to the directional coupler 42'. An output of the third EO modulator 44' is amplified by an optical amplifier 50' (e.g., an EDFA amplifier).

As noted above, the optical power divider 59' sends a portion of the LO sideband to the directional coupler 42' where it is combined with the filtered RF signal sideband from the RF signal path 34' and then passed through a balanced detector 43' to form the IF output signal. Note that it may be desirable for the optical path length for the LO sideband to match the optical path length for the received signal. Depending on the nonlinear medium 49' (e.g., SBS) used for the filter function, additional path length may be required on the LO sideband path to compensate, as will be appreciated by those skilled in the art.

The third EO modulator 44' of the filter function path 37' receives as its input the output of the LO path 36' (via the power divider 59'), rather than the unprocessed optical carrier signal from the CW laser 31' as in the embodiment of FIG. 1. On the filter function path 37', the light is modulated by a filter function input signal from a filter function signal generator 53' (e.g., an AWG) using the third EO modulator 44'.

As noted above, the filter function may be formed by combining multiple signals at different frequencies to use as pump signals in the SBS filter. Each pump signal will provide a Brillouin-shifted gain bandwidth whose width is dependent on the nonlinear optical medium used, e.g., on the order of 30 MHz. By assembling multiple pump signals, the filter passband width, center frequency, and shape can be set by the AWG 53'. A fixed optical bandpass filter (not shown), such as a fiber Bragg grating, may optionally follow the EO modulator 44' to select either the upper or lower sideband of the modulated filter function. An optical amplifier 38' (e.g., an EDFA) boosts the pump signals above the SBS threshold so that they create the desired SBS filter.

The optically modulated and amplified filter function signal is introduced to the RF signal path 34' using the optical circulator 46' so that it propagates along the same path as the RF signal, but in the opposite direction. Each pump signal produces a frequency-downshifted Stokes wave approximately 10 GHz below the filter function pump signal frequency, and a correspondingly upshifted anti-Stokes wave approximately 10 GHz above the filter function pump signal frequency. The Stokes waves provide SBS gain, enabling band pass filter functions, and the anti-Stokes waves provide equivalent SBS loss, enabling band stop filter functions.

As such, deliberate positioning of filter function pump signal frequencies may allow simultaneous implementation of band pass and band stop filter functions, for example, to provide image rejection in the frequency conversion process or to provide notch filtering of interfering signals within the desired RF signal pass band. Note that multiple SBS gain stages may be implemented by using power splitters after the filter function amplifier 38' and adding SBS media and optical circulators for a cascaded gain effect, if desired. This may be used to achieve high levels of SBS gain with minimal additional noise.

On the signal path, an RF signal (e.g., a microwave signal) is modulated onto the CW optical carrier by the first EO modulator 48', creating copies of the RF input spectrum as optical sidebands on either side of the laser signal. The modulated light then passes through an optical isolator 47' to attenuate the counter-propagating pump light from the filter function path 37'. When the modulated signal interacts with the counter-propagating filter function pump in the nonlinear optical medium 49', the portion of the RF spectrum that corresponds to the Brillouin-shifted filter function will pass through the medium with SBS gain or loss, while any light outside the filter pass band will be unaffected. The filtered signal then passes through the optical circulator 46' and the directional coupler 42', where it is combined with the LO sideband. The balanced detector 43' removes common-mode noise and increases the signal power of the IF output signal.

Referring additionally to the flow diagram 70 of FIG. 3, related method aspects associated with the system 30 are now described. Beginning at Block 71, an optical carrier signal is generated using an optical source, such as the CW laser 31, at Block 72. The method further includes processing the optical carrier signal using the LO path 36 (Block 73), and processing the optical carrier signal using the filter function path 37 coupled to the RF signal path 34, at Block 74. The method further illustratively includes processing the optical carrier signal using the RF signal path including the nonlinear medium 49 (e.g., SBS device), at Block 75, and generating an IF signal using a directional coupler 42/balanced detector 43 coupled to an output of the RF signal path 34 and an output of the LO path 36, at Block 76. The method of FIG. 3 illustratively concludes at Block 77.

Referring now to the flow diagram 70' of FIG. 4, related method aspects associated with the system 30' are now described. Beginning at Block 71', an optical carrier signal is generated using an optical source, such as the CW laser 31', at Block 72'. The method further includes processing the optical carrier signal using the LO path 36' (Block 73'), and processing the LO signal using the filter function path 37' coupled to the RF signal path 34', at Block 78'. The method further illustratively includes processing the optical carrier signal using the RF signal path including the nonlinear medium 49' (e.g., SBS device), at Block 75', and generating an IF signal using a directional coupler 42'/balanced detector 43' coupled to an output of the RF signal path 34' and an output of the LO path 36', at Block 76'. The method of FIG. 4 illustratively concludes at Block 77'.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A communications system comprising:
   an optical source configured to generate an optical carrier signal;
   a radio frequency (RF) signal path comprising a first electro-optic (EO) modulator coupled to the optical source and configured to modulate the optical carrier signal based upon an RF signal, a stimulated Brillouin scattering (SBS) device coupled to the first EO modulator, and an optical circulator downstream from the SBS device;

a local oscillator (LO) path comprising a second EO modulator coupled to the optical source and configured to modulate the optical carrier signal based upon an LO signal, and at least one optical bandpass filter coupled to the second EO modulator;

a filter function path coupled to the optical circulator comprising a third EO modulator configured to perform optical modulation based upon a filter function signal; and a detector coupled to the RF signal path and LO path and configured to generate an intermediate frequency (IF) signal based thereon.

2. The communications system of claim 1 wherein the RF signal path further comprises an optical isolator coupled between the first EO modulator and the SBS device.

3. The communications system of claim 1 wherein the filter function path further comprises a filter function signal generator coupled to the third EO modulator.

4. The communications system of claim 1 wherein at least one of the first, second, and third EO modulators comprises a Mach-Zehnder modulator.

5. The communications system of claim 1 wherein the filter function path is coupled to the LO path.

6. The communications system of claim 1 wherein the at least one optical bandpass filter comprises a pair of optical bandpass filters; and wherein the LO path further comprises an optical signal amplifier coupled between the pair of first optical bandpass filters.

7. The communications system of claim 1 further comprising a first power divider coupled between the optical source and the RF signal path, and between the optical source and the LO path.

8. The communications system of claim 7 further comprising a second power divider coupled between the first power divider and the LO signal path, and between the first power divider and the filter function signal path.

9. A communications system comprising:
an optical source configured to generate an optical carrier signal;

a radio frequency (RF) signal path comprising a first electro-optic (EO) modulator coupled to the optical source and configured to modulate the optical carrier signal based upon an RF signal, a stimulated Brillouin scattering (SBS) device coupled to the first EO modulator, and an optical circulator coupled to the SBS device;

a local oscillator (LO) path comprising a second EO modulator coupled to the optical source and configured to modulate the optical carrier signal based upon an LO signal, a pair of optical bandpass filters coupled to the second EO modulator, and an optical signal amplifier coupled between the pair of first optical bandpass filters;

a filter function path coupled to the LO path and comprising a third EO modulator configured to modulate an output of the LO path based upon a filter function signal and having an output coupled to the optical circulator; and a detector coupled to the RF signal path and the LO path and configured to generate an intermediate frequency (IF) signal based thereon.

10. The communications system of claim 9 wherein the RF signal path further comprises an optical isolator coupled between the first EO modulator and the SBS device.

11. The communications system of claim 9 wherein the filter function path further comprises a filter function signal generator coupled to the third EO modulator.

12. The communications system of claim 9 wherein at least one of the first, second, and third EO modulators comprises a Mach-Zehnder modulator.

13. A communications method comprising:
generating an optical carrier signal using an optical source;

processing the optical carrier signal using a radio frequency (RF) signal path comprising a first electro-optic (EO) modulator coupled to the optical source and configured to modulate the optical carrier signal based upon an RF signal, a stimulated Brillouin scattering (SBS) device coupled to the first EO modulator, and an optical circulator coupled to the SBS device;

processing the optical carrier signal using a local oscillator (LO) path comprising a second EO modulator coupled to the optical source and configured to modulate the optical carrier signal based upon an LO signal, and at least one optical bandpass filter coupled to the second EO modulator;

using a filter function path coupled to the optical circulator comprising a third EO modulator configured to perform optical signal modulation based upon a filter function signal; and generating an intermediate frequency (IF) signal using a detector coupled to the RF signal path and the LO path.

14. The method of claim 13 wherein the RF signal path further comprises an optical isolator coupled between the first EO modulator and the SBS device.

15. The method of claim 13 wherein the filter function path further comprises a filter function signal generator coupled to the third EO modulator.

16. The method of claim 13 wherein at least one of the first, second, and third EO modulators comprises a Mach-Zehnder modulator.

17. The method of claim 13 wherein the filter function path is coupled to the LO path and processes the optical carrier signal after processing by the LO signal path.

18. The method of claim 13 wherein the at least one optical bandpass filter comprises a pair of optical bandpass filters; and wherein the LO path further comprises an optical signal amplifier coupled between the pair of first optical bandpass filters.

19. The method of claim 13 further comprising a first power divider coupled between the optical source and the RF signal path, and between the optical source and the LO path.

20. The method of claim 19 further comprising a second power divider coupled between the first power divider and the LO signal path, and between the first power divider and the filter function signal path.

* * * * *